3 Sheets—Sheet 1.
G. H. POOR.
Assignor to THE AMERICAN BRAKE COMPANY.
BRAKE FOR LOCOMOTIVES.
No. 10,796. Reissued Jan. 11, 1887.
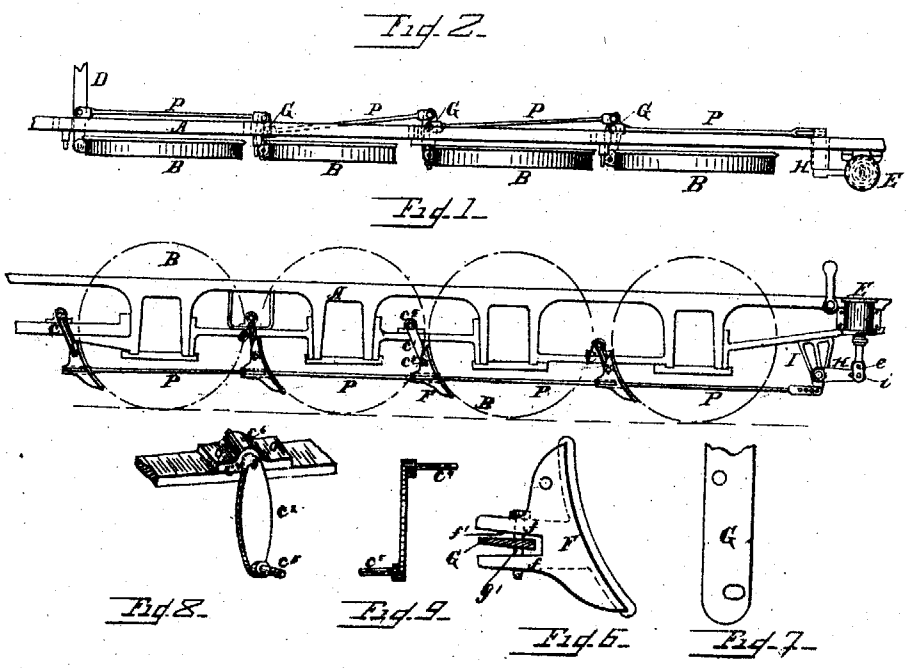
Witnesses
G. A. Taubenschmidt,
Edwin S. Clarkson
Inventor
George H. Poor
By his Attorney F. W. Rutter Jr.

3 Sheets—Sheet 2.

G. H. POOR.

Assignor to THE AMERICAN BRAKE COMPANY.

BRAKE FOR LOCOMOTIVES.

No. 10,796. Reissued Jan. 11, 1887.

Witnesses

G. A. Taubeschmidt,

Edwin S. Clarkson

Inventor

George H. Poor

By his Attorney F. W. Ritter Jr

3 Sheets—Sheet 3.

G. H. POOR.

Assignor to THE AMERICAN BRAKE COMPANY.

BRAKE FOR LOCOMOTIVES.

No. 10,796. Reissued Jan. 11, 1887.

Witnesses
S. A. Taubschmidt
Edwin S. Barkson

Inventor
George H. Poor
By his Attorney F. M. Ritter Jr.

UNITED STATES PATENT OFFICE.

GEORGE H. POOR, OF ST. LOUIS, MISSOURI, ASSIGNOR TO THE AMERICAN BRAKE COMPANY, OF SAME PLACE.

BRAKE FOR LOCOMOTIVES.

SPECIFICATION forming part of Reissued Letters Patent No. 10,796, dated January 11, 1887.

Original No. 346,441, dated July 27, 1886. Application for reissue filed December 16, 1886. Serial No. 221,779.

*To all whom it may concern:*

Be it known that I, GEORGE H. POOR, a citizen of the United States, residing at St. Louis, in the State of Missouri, have invented certain new and useful Improvements in Brakes for Locomotives and like Purposes; and I hereby declare the following to be a full, clear, and exact description of the same, reference being had to the accompanying drawings, wherein—

Figure 4:
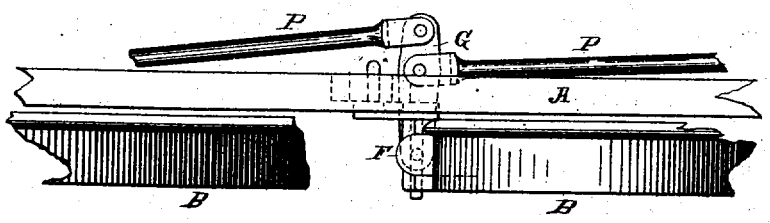
Figure 3:
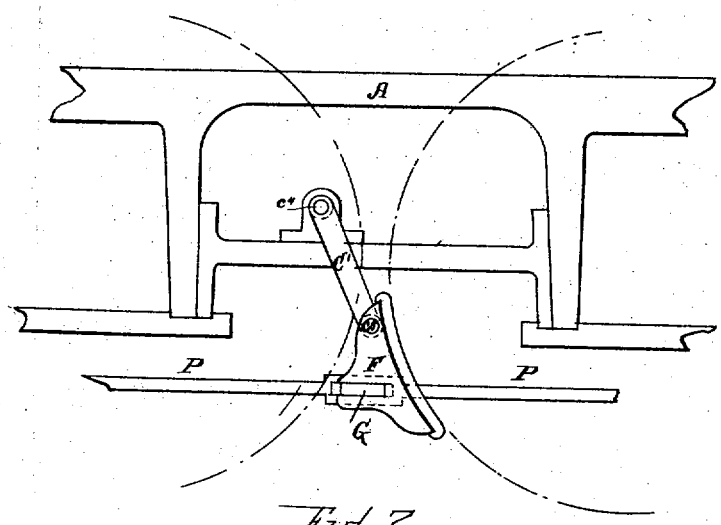
Figure 5:
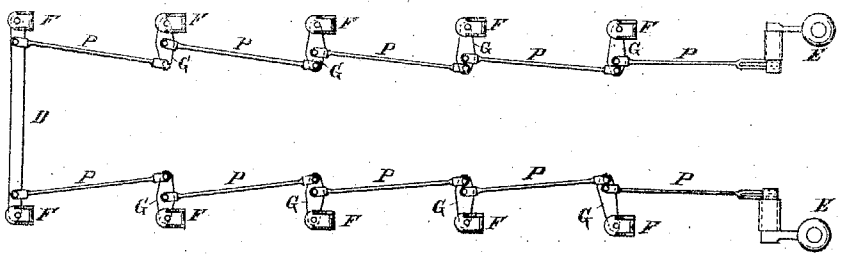
Figure 10:
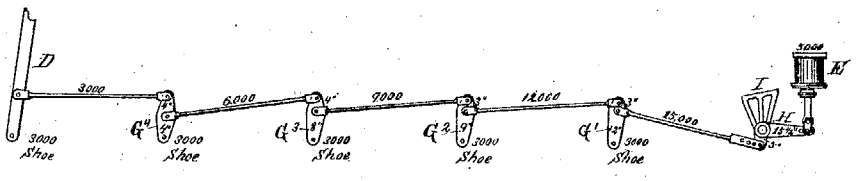

Figure 1 is a side elevation of a locomotive-frame and the drivers thereof having brakes embodying my invention applied thereto. Fig. 2 is a top elevation or plan view of the same. Figs. 3 and 4 are enlarged views of portions of what is shown in Figs. 1 and 2, to give a better idea of the connections of the individual pull-rod, floating lever, and brake-head as combined. Fig. 5 is a diagram or plan showing the brake mechanism as applied to both sides. Fig. 6 is a side elevation of the brake head and shoe, with sectional view of the floating levers for applying the power thereto, showing one means of compensating for the wear of the shoe and the position of the brake-heads. Fig. 7 is a detached view of the floating lever for applying power to the shoe. Fig. 8 is a perspective, and Fig. 9 a side elevation, of the hanger used to suspend the brake-head between the middle pair of drivers when the distance is too small to admit of the usual mode of hanging. Fig. 10 is a diagram of the floating levers, the bell-crank or power lever, and the pull-rods, showing the preferred connection, relative proportions, and arrangement of the same, whereby the power is equally applied to the several brake-heads.

Like letters refer to like parts wherever they occur.

My present invention relates to the construction of brakes in general, but has been especially devised for use as a driver-brake for locomotives, and has peculiar advantages when applied to locomotives having four or five coupled drivers, or what is termed the "consolidation" type of locomotives; but I do not wish to be understood as confining the invention to any special type of locomotive, or even to locomotives of all classes, as the devices will be found of general application as a brake system, especially where obstructions prevent the use of brake-beams to advantage.

I will now proceed to describe the preferred form illustrated in the drawings, so that others may apply the invention either in that form or modified, as circumstances and particular forms of cars or locomotives may render necessary.

In the drawings, A indicates the frame; B, the wheels or drivers of a locomotive; F, the brake-heads; C, the hangers by which the brake-heads are suspended from the frame A, which hangers may be of any approved form when the space between the drivers is sufficient; and C′, a special form of hanger adapted for use with the middle pair of drivers or where the distance between the drivers is too small to use the present form of hangers. This hanger C′ (see Figs. 8 and 9) is of flat or plate form, of such thickness as will permit of its arrangement and free movement between the driver (or wheel) and frame A, so that its point $c^4$ of suspension from the frame may be such as will permit the brake-head to swing back from the driver B when the brakes are released, and, in order to give it the necessary strength to resist the strain necessarily brought on it when the brakes are applied, said hanger may be widened out at its middle, as at $c^4$. It may be provided with two pivot-pins, one of which, $c^4$, is journaled in a box, $c^6$, on the frame A, while on the other, $c^5$, the brake-head F is journaled. By means of the above or equivalent hangers the several brake-heads F are suspended in front of their respective wheels or drivers.

It will be noticed that the brake-heads are used only on one side of the wheels, and all on the same, preferably the front, side.

The forward brake-heads F of the two sides are connected by a brake-beam, D, as shown in the drawings, while the remaining brake-heads are each connected with the horizontal floating lever G.

The preferred form of the brake-heads F and the horizontal floating levers G is shown in Figs. 6, 7, and 8—that is to say, the brake-head is formed with the rearwardly-diverging lugs *f f*, or in any other manner which will form a wedge-shaped slot, $f'$, widest at its outer end—and the end of the horizontal floating lever G, which is connected with the head F, is tapered in cross-section, or is wider at one edge than at the other, and the bolt-hole $g$, which receives the bolt or pin $g'$, that connects the head and the horizontal floating lever, is formed near the wider edge of the lever. (See Fig. 7.) The wide edge of the horizontal floating lever is toward the bottom or narrow portion of the wedge-shaped slot $f'$ of the head F, and thus the power is applied directly to the head, and the horizontal floating lever can maintain any given position, while the head can rock or move to compensate for wear, say of driver, &c. It is evident that a link or clevis connection which permitted motion between the brake-head and horizontal floating lever and between the horizontal floating lever and the pull-rod would accomplish similar results, but is not, in my opinion, as desirable as the construction shown, as there would be more lost motion between the brake-heads, power-levers, &c.

The horizontal floating levers G, I have numbered 1, 2, 3, &c., commencing nearest the source of power, and while the last in the series (see $G^4$, Fig. 10) should have its arms of substantially equal length, the arm which carries the brake-head F should gradually increase in length, and the arm to which the pull-rod is attached should gradually decrease in length the nearer to the power the lever of the series is—as, for instance, fourth lever, equal arms; third lever, two to one; second lever, three to one; first, four to one.

The several horizontal floating levers are successively connected by pull-rods P, which extend from the short arm of one lever to the point of applied power in the next lever of the series, so that I obtain a succession of horizontal levers of the third power so connected with each other and with the power as to divide up the power equally among all the shoes. The last of the horizontal levers of the series will be connected to brake-beam D.

As before pointed out, in case of an engine having four drivers, as shown in Figs. 1 and 2, which is the most common form of consolidation locomotives, the first horizontal lever of Fig. 10 would be omitted. If the engine had but three drivers, then the first and second horizontal levers would be omitted, and if the engine had but two drivers then the levers G—first, second, and third—of Fig. 10 would be omitted. To this system the power may be applied by means of an air or steam cylinder, or by any other of the many well-known ways or means.

When an air or steam cylinder is employed, as shown at E, I prefer to communicate the power through a bell-crank lever, H, having its shaft or pivot at the angle and carried on a fulcrum-bracket, I, projecting down from the frame A, as thereby the strain or pull from both piston-rod and pull-rods is rendered direct or in a right line, the arc movement of the outer end of the long arm or bell-crank lever I being compensated for by the links $e$, which connect the piston and bell-crank.

It will be noted that by using a series of floating levers operating in substantially a horizontal plane, as shown, the shoes may be placed on one side only, so as to adapt the devices for the "consolidation" type of engines or those having close-coupled drivers, all wear of the brake-shoes can be compensated for, the power applied uniformly, if desired, and the operative combination reduced to a single series of levers and a single line of pull-rods.

I am aware that brake-shoes carried or supported by rock-arms fulcrumed on plates attached to the locomotive-frame have been actuated by equalizers or floating levers connected by rods, the terminal equalizer being anchored to or having a fulcrum on the locomotive-frame, as shown in Beal's Patent No. 271,189, and Beard's Patent No. 309,122; and I am also aware that suspended brake-heads have been actuated by a double line of pull-rods and vertically-arranged levers of the third power, as shown in Clark's English Patent No. 2,293 of 1874, and do not herein claim the same. In my invention the shoe or brake-head is suspended by a link or hanger, or its equivalent, or is what may be termed a "floating brake-head," as no fulcrum is interposed between it and the floating lever, by which it is operated. As a result no power is lost or uselessly expended, and the shoe automatically adjusts itself to compensate for wear.

Having thus described the nature, operation, and advantages of my invention, what I claim, and desire to secure by Letters Patent, is—

1. In a brake system, the combination of a series of link-suspended or floating brake-heads, one for each of the wheels of one side of a locomotive, all of said brake-heads suspended on one and the same side of the respective wheels, a series of substantially horizontal floating levers for actuating said brake-heads, and a single line of pull-rods, substantially as and for the purposes specified.

2. The combination, in a brake system, of a series of link-suspended or floating brake-heads, and a series of substantially horizontal floating levers for actuating the brake-heads, said levers connected by pull-rods arranged so that all the levers shall be levers of the third order, substantially as and for the purposes specified.

3. The combination, with a series of link-suspended or floating brake-heads, of a series of substantially horizontal floating levers, each of which is directly connected at one end to its respective brake-head, and by its opposite end connected to the next lever of the series at a point between its two extremities, substantially as and for the purposes specified.

4. The combination of two systems of brakes, one for the wheels of each side, each of said systems consisting of a series of link-suspended or floating brake-heads, substantially horizontal floating levers, and a single line of pull-rods which connect all the levers of a side, so that said levers shall be levers of the third order, and a transverse brake-beam which connects the two systems at one end, substantially as and for the purposes specified.

5. In a brake system, the combination, with the lever of wedge-shaped cross-section, of a brake-head having a wedge-shaped slot, the thickest edge of the lever arranged in the narrow portion of the slot, and a pin for connecting the two, so that the head can rock on the lever, substantially as and for the purposes specified.

In testimony whereof I affix my signature, in presence of two witnesses, this 6th day of December, 1886.

GEORGE H. POOR.

Witnesses:
H. A. PIKE,
H. GUELS.